(12) United States Patent
Koike et al.

(10) Patent No.: US 6,888,281 B2
(45) Date of Patent: May 3, 2005

(54) STATOR OF ALTERNATOR HAVING LEAD WIRES FIRMLY HELD ON CIRCULAR COIL END OF STATOR WINDING

(75) Inventors: Akihito Koike, Kariya (JP); Hiroaki Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/448,085

(22) Filed: May 30, 2003

(65) Prior Publication Data

US 2003/0230953 A1 Dec. 18, 2003

(30) Foreign Application Priority Data

Jun. 18, 2002 (JP) .................................... 2002-177075

(51) Int. Cl.[7] .............................. H02K 3/04; H02K 3/50
(52) U.S. Cl. ..................... 310/179; 310/254; 310/180; 310/184; 310/201; 310/260
(58) Field of Search ............................... 310/179, 180, 310/184, 201, 260, 254, 42, 208, 51, 207

(56) References Cited

U.S. PATENT DOCUMENTS

| | | | | |
|---|---|---|---|---|
| 3,631,279 A | * | 12/1971 | Bozsvai et al. | 310/260 |
| 4,237,398 A | * | 12/1980 | Chigirinsky et al. | 310/214 |
| 4,318,022 A | | 3/1982 | Miller | |
| 4,616,407 A | * | 10/1986 | Tamaki et al. | 29/596 |
| 4,954,734 A | | 8/1990 | Iguchi et al. | |
| 5,714,822 A | * | 2/1998 | Kawano et al. | 310/179 |
| 6,043,584 A | * | 3/2000 | DeHart | 310/260 |
| 6,204,586 B1 | * | 3/2001 | Umeda et al. | 310/179 |
| 6,376,961 B2 | * | 4/2002 | Murakami et al. | 310/184 |
| 6,396,185 B1 | * | 5/2002 | Asao et al. | 310/180 |
| 6,462,453 B1 | * | 10/2002 | Asao et al. | 310/179 |
| 6,486,586 B2 | * | 11/2002 | Higashino et al. | 310/263 |
| 6,498,414 B2 | * | 12/2002 | Asao | 310/184 |
| 6,501,204 B1 | * | 12/2002 | Oohashi et al. | 310/179 |
| 6,501,205 B1 | * | 12/2002 | Asao et al. | 310/184 |

FOREIGN PATENT DOCUMENTS

| | | | | |
|---|---|---|---|---|
| EP | 1 143 596 A2 | | 10/2001 | |
| GB | 705650 | | 3/1954 | |
| JP | 54115704 | * | 9/1979 | ............ H02K/3/50 |
| JP | 55026012 | * | 2/1980 | ............ H02K/3/38 |
| JP | 56015143 | * | 2/1981 | ............ H02K/3/50 |
| JP | A-63-294242 | | 11/1998 | |
| JP | 1376823 | * | 5/2003 | ............ H02K/15/00 |

* cited by examiner

Primary Examiner—Dang Le
Assistant Examiner—Heba Elkassabgi
(74) Attorney, Agent, or Firm—Oliff & Berridge, PLC (57) ABSTRACT

An alternator includes a stator and a rotor disposed inside the stator and rotated by an engine of an automobile. The stator is composed of a cylindrical stator core and a stator winding held in the stator core. The stator winding extends from an axial end of the stator core, forming a circular coil end along an axial circumference of the stator core. Lead wires led out from phase-windings in the stator winding are held on and along the circular coil end and bonded thereto with adhesive. A depressed ditch is formed on the coil end, and the lead wires are disposed in the depressed ditch and firmly held therein to prevent movement of the lead wires relative to the coil end.

5 Claims, 9 Drawing Sheets

FIG. 1

FRONT SIDE ←→ REAR SIDE

STATOR OF ALTERNATOR HAVING LEAD WIRES FIRMLY HELD ON CIRCULAR COIL END OF STATOR WINDING

CROSS-REFERENCE TO RELATED APPLICATION

This application is based upon and claims benefit of priority of Japanese Patent Application No. 2002-177075 filed on Jun. 18, 2002, the content of which is incorporated by reference.

BACKGROUND OF THE INVENTION

1. Field of the Invention

The present invention relates to a stator of an alternator for use in an automobile vehicle, and more particularly to such a stator having lead wires firmly held on a circular coil end of a stator winding.

2. Description of Related Art

A star-connection and a delta-connection are widely used for forming a three-phase stator winding of an alternating current generator. In the star-connection, one end of each phase-winding is connected to a neutral point, and generated alternating current is outputted from the other end of each phase-winding. In the delta-connection, both ends of each phase-winding are connected to another phase-winding, forming an annular circuit as a whole, and generated alternating current is taken out from three junctions in the annular circuit.

Figure 15:
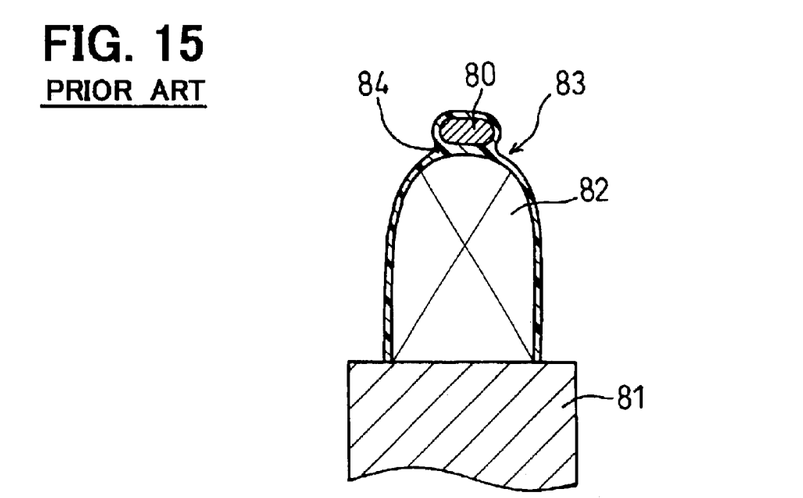
FIG. 15 is a schematic view showing a conventional form of a coil end to which a lead wire is attached.

Lead wires connecting phase-windings are usually disposed on a coil end formed at an axial end of a stator core. An example of a conventional structure of fixing the lead wires on the coil end is disclosed in JP-A-2001-103697. An essence of the fixing structure is shown in FIG. 15 attached hereto. A lead wire 80 led out from a phase winding is positioned on and along a circular coil end 82, which is formed at an axial end of a stator core 81, and is electrically connected to another phase-winding. For fixing the position of the lead wire 80, the lead wire 80 is connected to a top portion 83 of the coil end 82 with adhesive 84.

However, the lead wire 80 connected to the coil end 82 in such a conventional manner may be peeled off from the coil end 82 due to vibration of the generator, because the lead wire is fixed only by an adhesive force of the adhesive 84. Especially, in an alternator mounted on an automotive vehicle that generates a high vibration, the lead wire has to be firmly fixed to the coil end to avoid such peeling-off.

SUMMARY OF THE INVENTION

The present invention has been made in view of the above-mentioned problem, and an object of the present invention is to provide an improved stator of an alternator, in which lead wires are firmly fixed to a coil end.

An alternator for use in an automotive vehicle includes a stator and a rotor disposed inside the stator and rotated by an engine of the automotive vehicle. The stator is composed of a cylindrical stator core and a stator winding held in the stator core. The stator winding disposed in the cylindrical stator core extends from both axial ends of the stator core, forming circular coil ends along a circumferential axial ends of the stator core. The stator winding is composed of phase-windings, e.g., three phase-windings connected in a star-connection, a delta-connection, or the like. For forming such connection in the stator winding, lead wires led out from phase-windings are disposed on and along the circular coil end and mechanically connected thereto.

To restrict movement of the lead wires relative to the coil end due to vibration of the alternator and to firmly hold the lead wires on the coil end, a top portion of the circular coil end is depressed, thereby forming a depressed ditch. The lead wires are held in the depressed ditch and mechanically connected thereto with adhesive. The depressed ditch is formed to fit a cross-sectional shape of the lead wires. In a case where a lead wire having a rectangular cross-section is used, the depressed ditch is formed in a shape having two sides engaging with two sides of the rectangular cross-section of the lead wire. The depressed ditch may be formed after the circular coil end is formed. In a case where the stator winding is formed by using plural U-shaped segments, a top portion of each segment may be depressed before the segments are inserted into the stator core.

Alternatively, a depressed groove that engages with the top portion of the circular coil end may be formed on the lead wire by presswork. It is also possible to form circular peaks along the circular coil end and to form a valley between the peaks. In this case, the lead wires are disposed in the valley and firmly held therein.

According to the present invention, since the lead wires are engaged with the coil end and firmly connected thereto, the lead wires are prevented from being separated from the coil end due to vibration during operation of the alternator.

Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1–11. First, referring to FIG. 1, a structure of an alternator 1 for use in an automotive vehicle will be described. The alternator 1 includes a stator 2, a rotor 3, a housing 4, a rectifier 5 and other associated components. The rotor 3 is composed of a shaft 6, a Lundell-type pole core 7 fixed to the shaft 6, a field coil 8 wound on the pole core 7, and slip rings 9, 10 fixed to the shaft 6. A slant fan 11 is connected to a front side of the pole core 7, and a centrifugal fan 12 is connected to a rear side of the pole core 7. A pulley 20 is fixed to a the shaft 6, and the rotor 3 is rotated by an engine mounted on an automobile.

Figure 1:
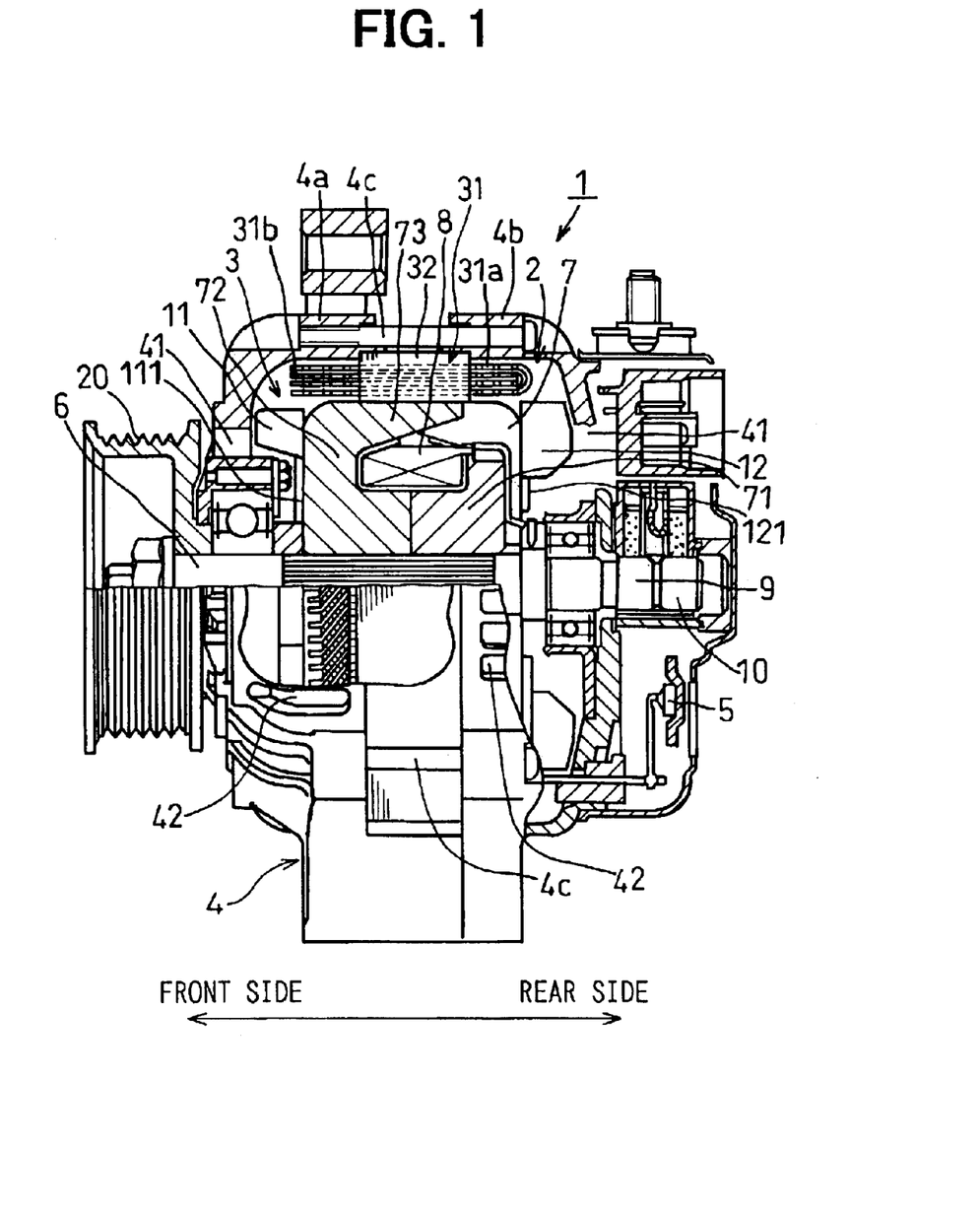
FIG. 1 is a cross-sectional view showing an entire structure of an alternator.

The Lundell-type pole core 7 is a known type and composed of a pair of cores, each having a boss 71 fixed to the shaft 6, a disc portion 72 and six claw poles 73. By coupling the pair of cores to face each other, a pole core 7 having twelve claw poles is formed. The slant fan 11 is composed of a base plate 111 connected to a front surface of the pole core 7 by welding or the like and blades each having a portion slanted relative to the base plate 111 and an upright portion. The centrifugal fan 12 is composed of a base plate 121 connected to a rear surface of the pole core 7 and blades standing from the base plate 121 with a right angle.

The housing 4 is composed of a front housing 4a and a rear housing 4b, both being connected by through-bolts 4c. Cooling air is introduced into the housing 4 through inlet windows 41 formed at both axial sides of the housing 4, and the cooling air is blown out through outlet windows 42 formed at shoulder portions of the housing 4. The rectifier 5 for rectifying alternating current into direct current is mounted on the rear side of the housing 4. The stator 2 functioning as an armature is composed of a cylindrical stator core 32 having plural slots 35 (shown in FIG. 2) and a stator winding 31 formed by plural U-shaped conductor segments 33 inserted into the slots 35.

Figure 2:
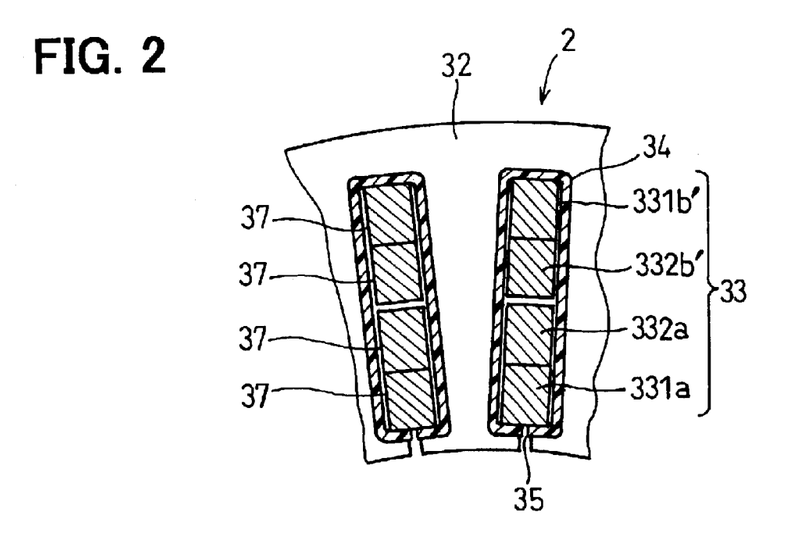
FIG. 2 is a cross-sectional view showing stator slots in which conductors of U-shaped conductor segments are inserted.
Figure 3:
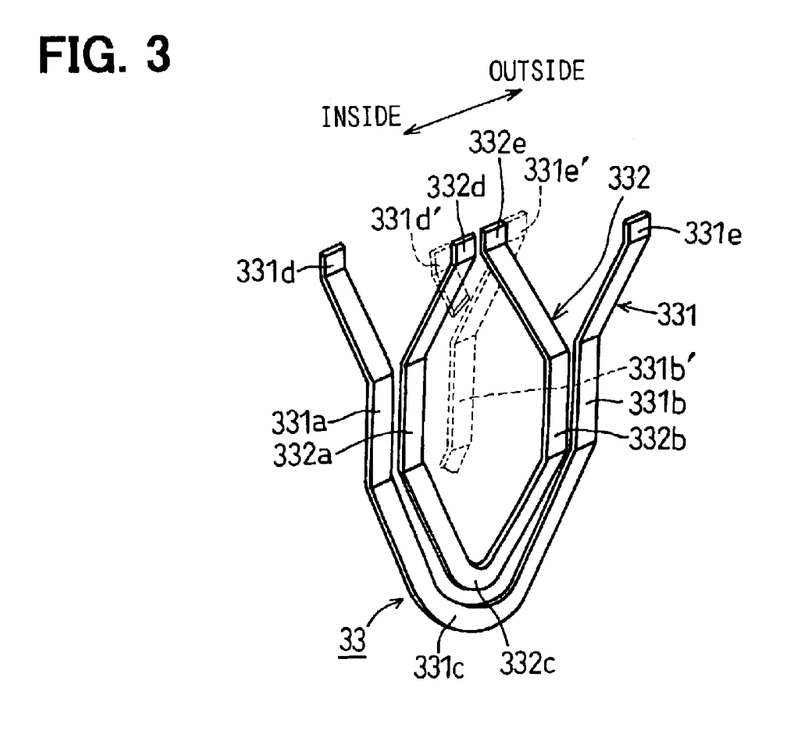
FIG. 3 is a perspective view showing a large conductor segment and a small conductor segment.

Referring to FIGS. 2 and 3, the stator winding 31 will be described in detail. As shown in FIG. 2, conductors of the U-shaped conductor segments 33 are inserted into the slots 35 of the stator core 32. The conductors inserted into the slots 35 are insulated from the stator core 32 by an insulator 34. Plural slots 35, each having an opening at an inner surface of the stator core 32, are formed in the stator core 32 so that a multi-phase stator winding is accommodated in the slots 35. In this particular embodiment, 36 slots for accommodating a three-phase stator winding are formed.

As shown in FIG. 3, the conductor segments 33 include a large conductor segment 331 and a small conductor segment 332. Both of the large and small conductor segments 331, 332 are made of a conductive wire such as a copper wire having a rectangular cross-section. The conductive wire covered with an insulation film 37 (shown in FIG. 2) is formed into U-shaped conductor segments. The large conductor segment 331 includes a pair of straight conductor portions 331a and 331b, a turning portion 331c connecting the pair of conductor portions, and a pair of segment ends 331d and 331e. Similarly, the small conductor segment 332 includes a pair of straight conductor portions 332a and 332b, a turning portion 332c connecting the conductor portions, and a pair of segment ends 332c and 332e.

As shown in FIG. 2, the conductor portion 331a is positioned at an inner most position in the slot 35, and therefore the conductor portion 331a is referred to as a first layer conductor. The conductor portion 332a is positioned next to the first layer conductor 331a and referred to as a second layer conductor. The conductor portion 332b that makes a pair with the conductor portion 332a is inserted into another slot 35 that is one-pole pitch apart from the slot in which the conductor portion 332a is inserted and is positioned at a third layer position in that slot. The conductor portion 332b is referred to as a third layer conductor. The conductor portion 331b that makes a pair with the conductor portion 331a is inserted into the same slot into which the conductor portion 332b is inserted and positioned at a fourth layer position (an outermost position) in that slot. FIG. 2 shows the one slot where the first layer conductor 331a, the second layer conductor 332a, a third layer conductor 332b' (a third layer conductor of another segment), and a fourth layer conductor 331b' (a fourth layer conductor of another segment) are inserted in this order.

A rear coil end 31a (shown in FIG. 1) is formed by turning portions 331c, 332c of plural conductor segments, and each turning portion 332c of the small segment 332 is positioned inside each turning portion 331c of the large segment 331. A front coil end 31b (shown in FIG. 1) is formed by segment ends and slanted portions connecting the segment ends and the conductor portions of plural conductor segments. The segment end 332c of the small conductor segment 332 and a segment end 331d' of a large conductor segment 331 are electrically connected by welding, as shown in FIG. 3. Similarly, the segment end 332e of the small conductor segment 332 and a segment end 331e' of another large conductor segment 331 are electrically connected by welding. The three-phase stator winding 31 is formed by electrically connecting the segment ends of the plural U-shaped conductor segments in this manner.

Figure 4:
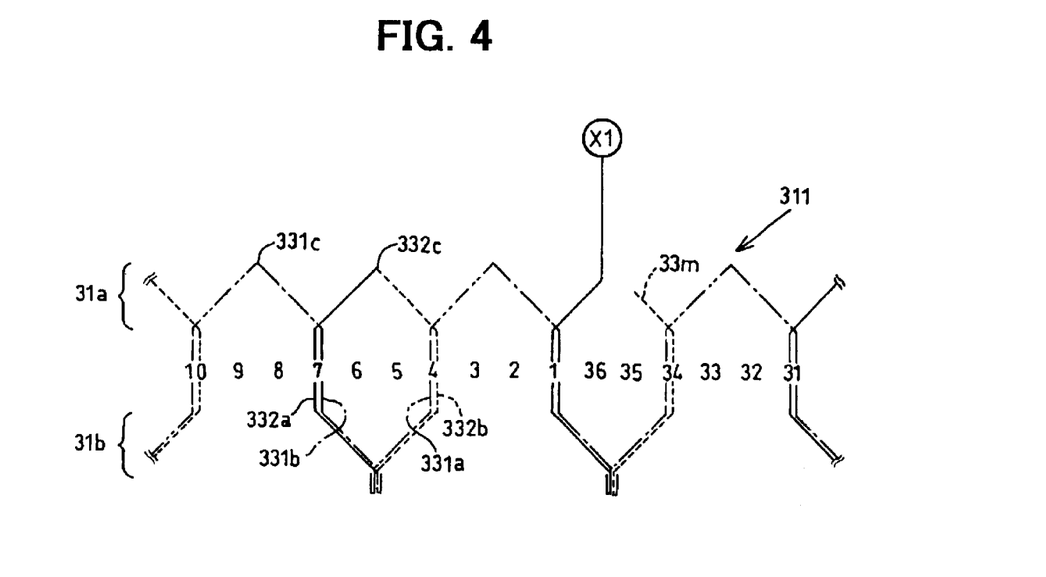
FIG. 4 is a diagram showing a first winding in an X-phase-winding.
Figure 5:
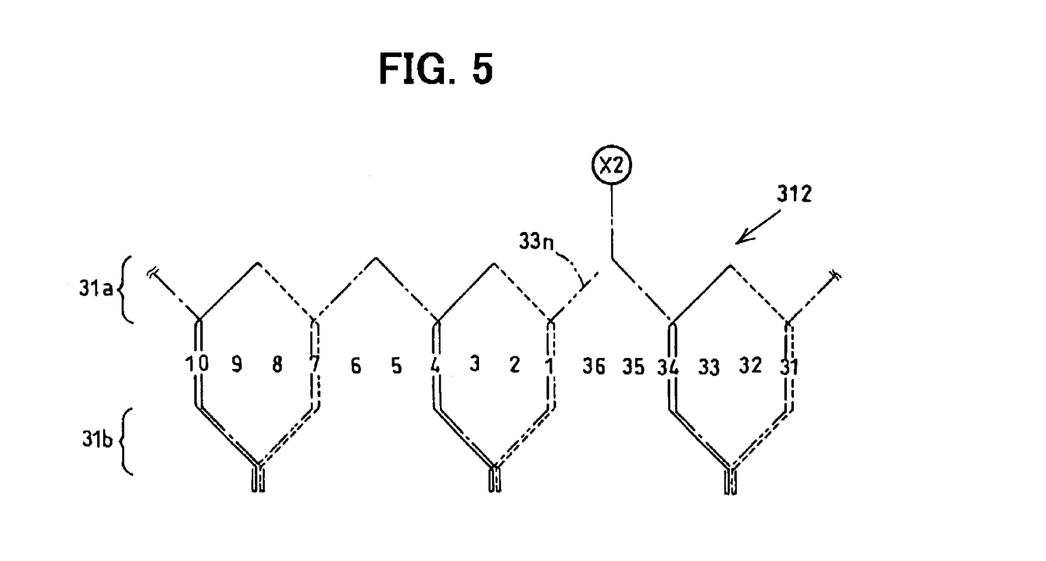
FIG. 5 is a diagram showing a second winding in the X-phase-winding.
Figure 6:
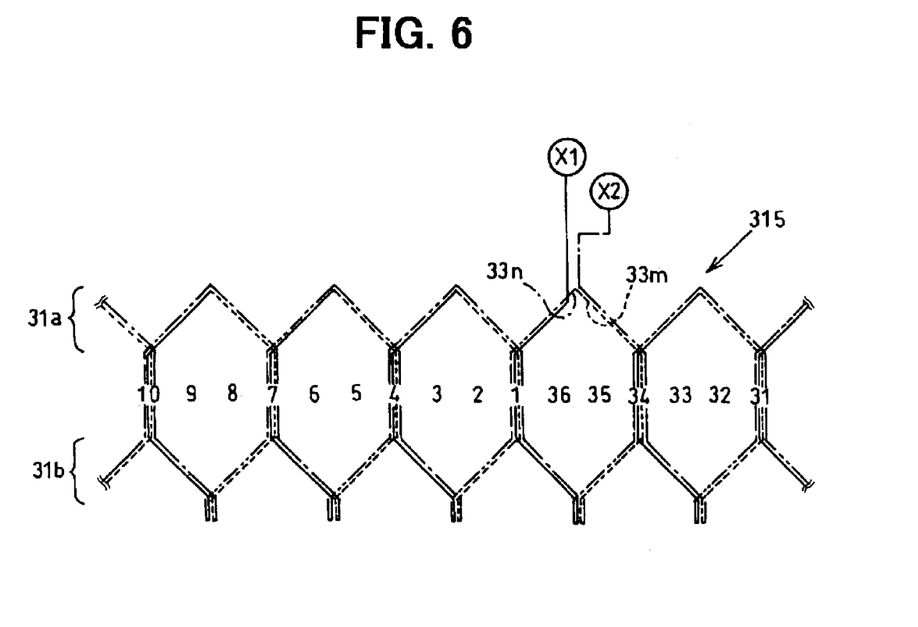
FIG. 6 is a diagram showing the X-phase-winding in which the first and the second winding are combined.

Referring to FIGS. 4–6, formation of an X-phase-winding will be described as a representative of three phase-windings, X, Y and Z. In these drawings, the first conductor layer is shown by a chained line with two dots, the second conductor layer with a solid line, the third conductor layer with a dotted line, and the fourth conductor layer with a chained line with one dot. The rear coil end 31a formed by turning portions 331c, 332c of the conductor segments 33 is shown at an upper side, and the front coil end 31b is shown at a bottom side. Numbers shown along a horizontal line in these drawings are slot numbers from 1 to 36.

As shown in FIG. 4, a conductor of a conductor segment 33 is positioned in one slot, and another conductor of the same conductor segment is positioned in another slot which is apart from the former by three slots (one-pole-pitch). At the front coil end 31b, a segment end of the third layer conductor 332b disposed in one slot is connected to a segment end of the fourth layer conductor 331b disposed in another slot which is apart from the former by one-pole-pitch. A segment end of the first layer conductor 331a disposed in one slot is connected to a segment end of the second layer conductor 332a disposed in another slot which is apart from the former by one-pole-pitch. In this manner, a first winding 311 having two overlapped turns per one slot is formed. Similarly, as shown in FIG. 5, a second winding 312 having two overlapped turns per one slot is formed.

As shown in FIG. 6, one end 33m of the first winding 311 is connected to one end 33n of the second winding 312, thereby forming the X-phase-winding 315 having four overlapped turns per one slot. For connecting two ends 33m, 33n, a special segment having turning portion connecting two ends 33m, 33n is used. The special segment is a little differently shaped from the regular segments 33 (the large segment 331 and the small segment 332).

Figure 7:
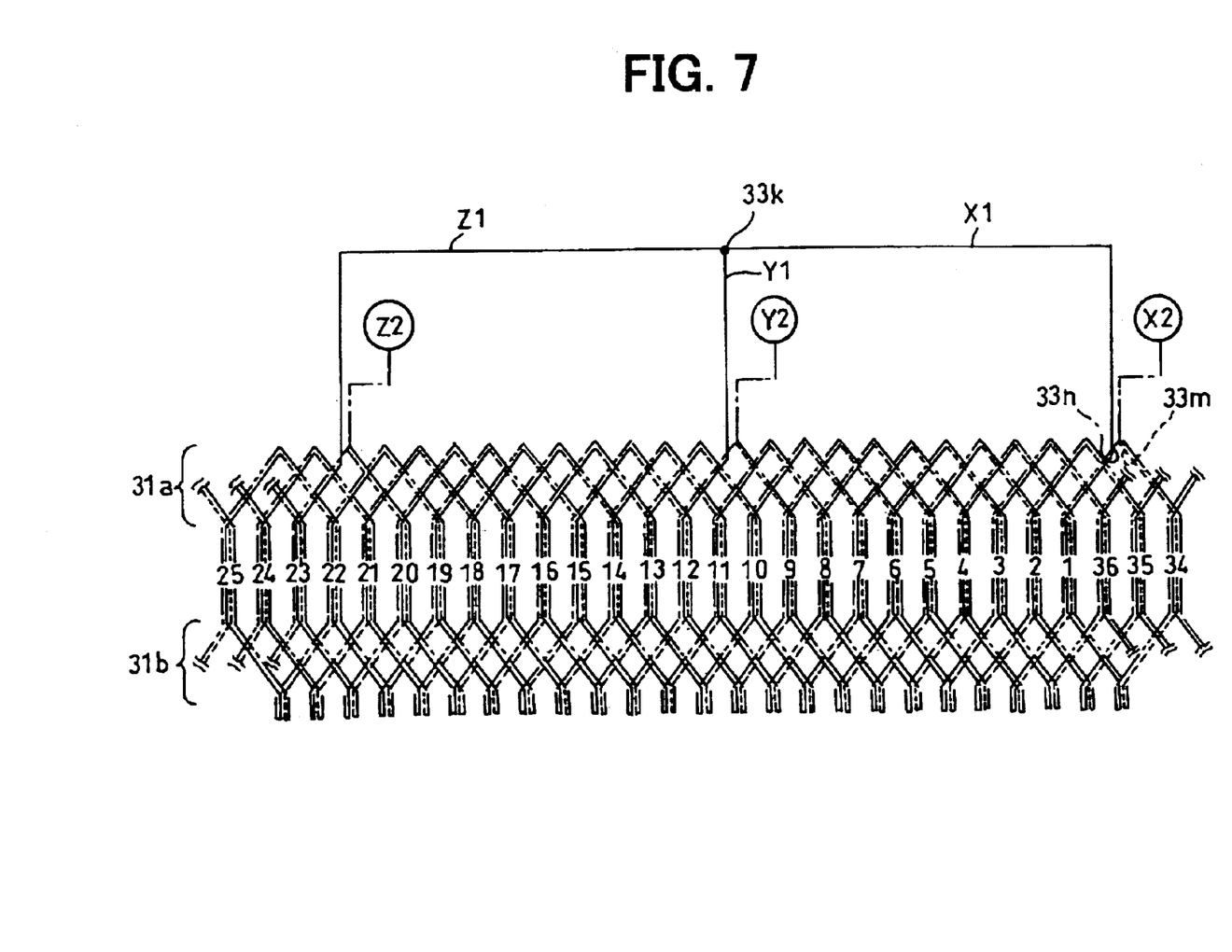
FIG. 7 is a diagram showing an entire stator winding, in which three phase-windings are connected to a neutral point through respective lead wires.
Figure 8:
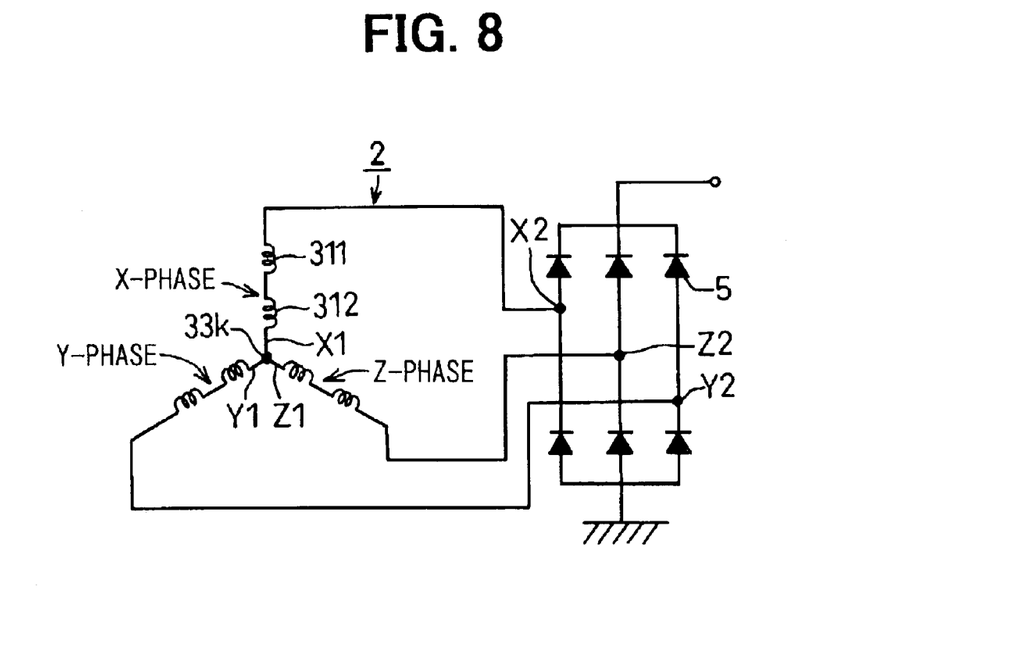
FIG. 8 is a circuit diagram showing a star-connection in the stator winding.

The other phase-windings, the Y-phase-winding and the Z-phase winding, are similarly formed in the slots which are apart from one phase to another phase by an electrical angle of 120 degrees. As shown in FIG. 7, one end of each phase-winding is connected to a lead wire X1, Y1 and Z1, respectively. The lead wires X1, Y1 and Z1 are connected to a neutral point 33k. The other ends X2, Y2 and Z2 of the phase-windings are led out from the rear coil end side. As shown in FIG. 8, the stator winding 31 composed of the X-phase-winding, the Y-phase-winding and the Z-phase-winding is connected in a star connection. That is, the lead wires X1, Y1 and Z1 are connected to the neutral point 33k, and the other ends X2, Y2 and Z2 of the phase-windings are connected to respective points in the rectifier 5.

A manufacturing process of the stator winding 31 will be briefly described. Plural U-shaped conductor segments including the large conductor segments 331 and the small conductor segments 332 are prepared. The U-shaped conductor segments are inserted into slots 35 from the rear side of the stator core 32, so that the conductor portions are positioned in each slot 35 as shown in FIG. 2. That is, the first layer conductor 331a, the second layer conductor 332a, the third layer conductor 332b' and the fourth layer conductor 331b' are positioned in this order from the inside of the stator 32. The turning portions 332c of the small conductor segments 332 are covered by the turning portions 331c of the large conductor segments 331, thereby forming the rear coil end 31a.

After the conductor segments are inserted into the slots 35, straight portions of the segments extending to the front side of the stator core 32 are bent, so that a distance between the segment ends 331d and 331e of the large conductor segment 331 is widened, and a distance between the segment ends 332c and 332e is narrowed. More particularly, each straight portion of the large conductor segment 331 is bent by 1.5 slot-pitches, and each straight portion of the small conductor segment 332 is bent by 1.5 slot-pitches, thereby positioning the segment ends 331d, 331e, 332c, 332e as shown in FIG. 3. All the conductor segments are bent in the same manner. Then, each pair of segment ends is electrically connected by welding. More particularly, the segment ends 331e' and 332e; and segment ends 332c and 331d' are electrically connected (refer to FIG. 3).

Now, how the lead wires led out from the phase-windings are connected and held on the rear coil end will be described. The rear coil end 31a extending from the axial rear end of the cylindrical stator core 32 is formed in a circular shape along a circumference of the cylindrical stator core. As shown in FIG. 7, the lead wires X1, Y1 and Z1 led out from the respective phase-windings extend to the rear coil end side. The lead wires X1 and Z1 are further extended along the circular rear coil end 31a toward the lead wire Y1 and are electrically connected to the lead wire Y1. The lead wire Y1 is positioned between the lead wires X1 and Z1 so that the length of lead wires X1 and Y1 extending along the circular rear coil end 31a becomes shortest.

Figure 9:
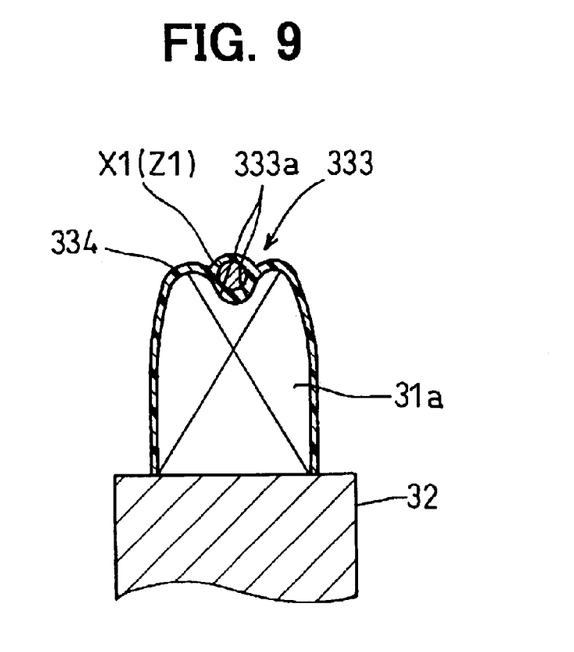
FIG. 9 is a schematic view showing a rear coil end having a depressed ditch for holding a lead wire therein, as a first embodiment of the present invention.

As shown in FIG. 9, a depressed ditch 333 is formed on and along the top portion of the rear coil end 31a. A bottom surface 333a of the depressed ditch 333 is formed to fit a cross-sectional shape of the lead wires X1 (or Z1). In this particular embodiment shown in FIG. 9, the cross-sectional shape of the lead wire X1 (Z1) is round. Therefore, the shape of the bottom surface 333a is formed in a round shape. The lead wire X1 (Z1) is disposed in the depressed ditch 333 and fixed thereto with adhesive 334. The adhesive 334 is made of heat-resistant resin having a high electrical insulation ability, such as epoxy-type resin or silicone-type resin.

The depressed ditch 333 is formed on and along the circular rear coil end 31a, pressing a jig against the rear coil end 31a after the stator winding 31 and the read coil end 31a are formed. The depressed ditch 333 may be formed for covering only places where the lead wires X1, Z1 are disposed, or all along an entire circumference of the circular coil end 31a.

Since the lead wires are disposed in the depressed ditch 333 and fixed thereto with the adhesive 334, movement of the lead wires relative to the coil end 31a is surely restricted, and the lead wires are firmly held in the depressed ditch 333. Therefore, the lead wires are not separated from the coil end 31a even when a high vibrating force is applied to the lead wires. Thus, reliability of the alternator 1 is enhanced.

Figure 10:
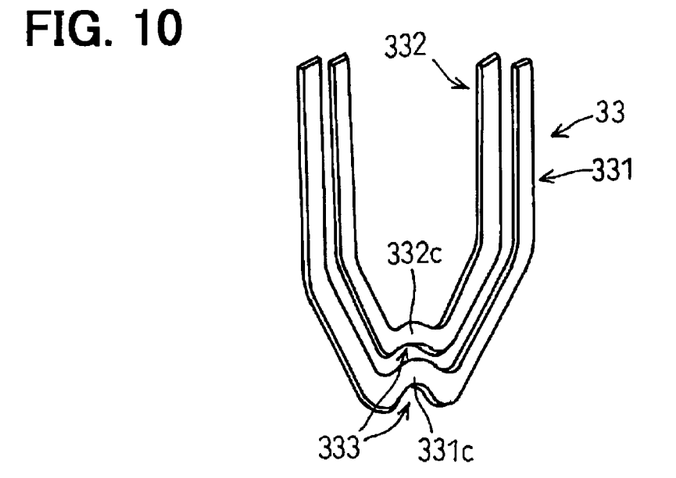
FIG. 10 is a perspective view showing U-shaped conductor segments, each having a depressed portion formed on a turning portion.

As shown in FIG. 10, depressed portions corresponding to the depressed ditch 333 may be formed on the turning portions 331c, 332c of the individual conductor segments 33 (the large conductor segment 331 and small conductor segment 332) before the segments are inserted into the slots 35 of the stator core 32. In this manner, interferences among the phase-windings, which may be possibly caused at a time of forming the depressed ditch 333 after the coil end 31a is formed, are avoided.

Figure 11:
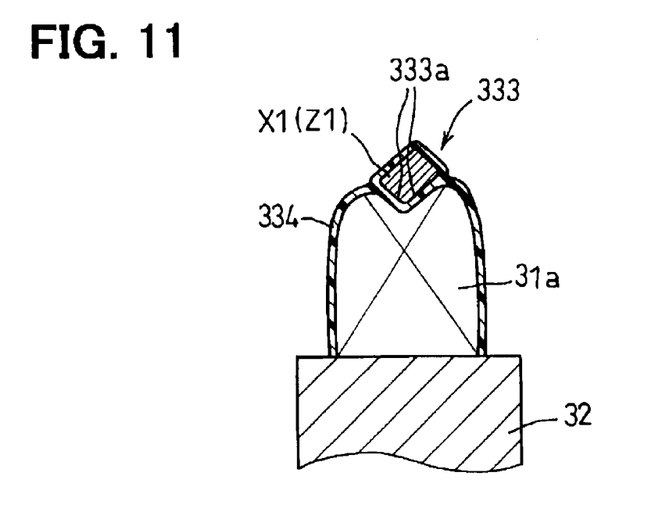
FIG. 11 is a schematic view showing a rear coil end having a depressed ditch for holding a lead wire therein, as a modified form of the first embodiment, the depressed ditch including two side surfaces contacting the lead wire.

The shape of the depressed ditch 333 may be changed to a form shown in FIG. 11. In the case where the lead wire has a rectangular cross-section, the depressed ditch 333 is formed to fit the rectangular cross-section. The bottom surface 333a of the depressed ditch 333 is formed in a shape that includes two side surfaces contacting two sides of the rectangular cross-section of the lead wire. In this manner, the lead wire can be firmly held in the depressed ditch 333, avoiding any movement relative to the coil end 31a. The cross-sectional shape of the lead wire is not limited to the rectangular shape, it may be other polygonal shapes. In any case, the depressed ditch 333 is shaped to fit the cross-section of the lead wire.

Figure 12:
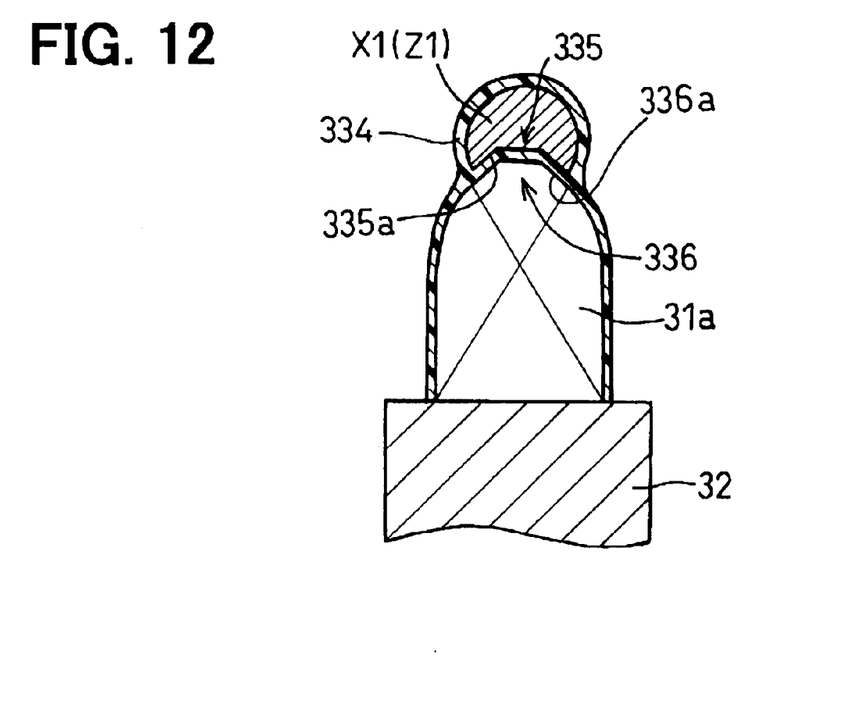
FIG. 12 is a schematic view showing a rear coil end to which a lead wire having a depressed groove is connected, as a second embodiment of the present invention.

A second embodiment of the present invention will be described with reference to FIG. 12. In this embodiment, the depressed ditch for restricting movement of the lead wire X1 (Z1) is not formed on the coil end 31a. Instead, the top portion of the circular coil end 31a is deformed to have a top portion 336 that engages with a depressed groove 335 formed on the lead wire. In this particular embodiment, the top portion 336 has a top flat surface and a pair of sloped outer surfaces 336a. The depressed groove 335 is formed to have a flat bottom surface and a pair of sloped inner surfaces 335a, so that the depressed groove 335 engages with the top portion 336 of the coil end 31a. The depressed groove 335 is formed on a wire having a round cross-section by press-work. After the lead wire X1 (Z1) is engaged with the coil end 31a, both are connected to each other with the adhesive 334. In this manner, the lead wire can be firmly held on the coil end 31a. It is possible to change the shapes of the depressed groove 335 and the top portion 336 to other shapes as far as both engage with each other.

Figure 13:
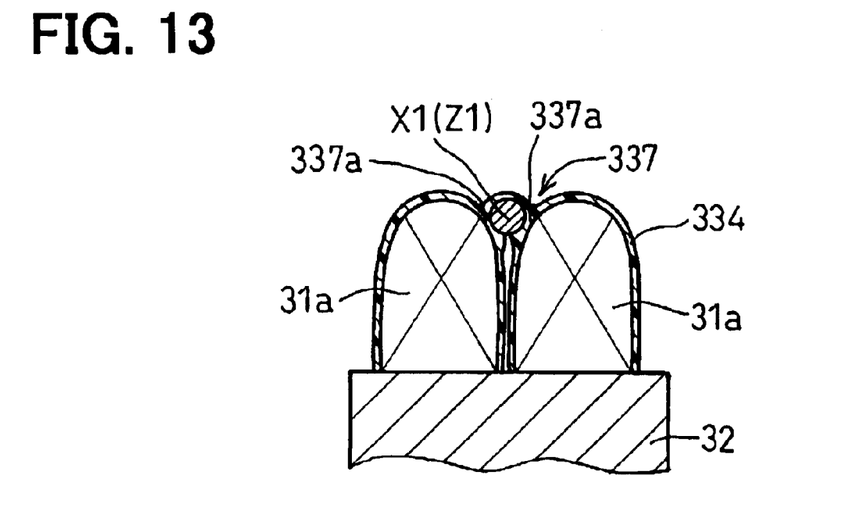
FIG. 13 is a schematic view showing a rear coil end that includes a valley for holding a lead wire therein, as a third embodiment of the present invention.
Figure 14:
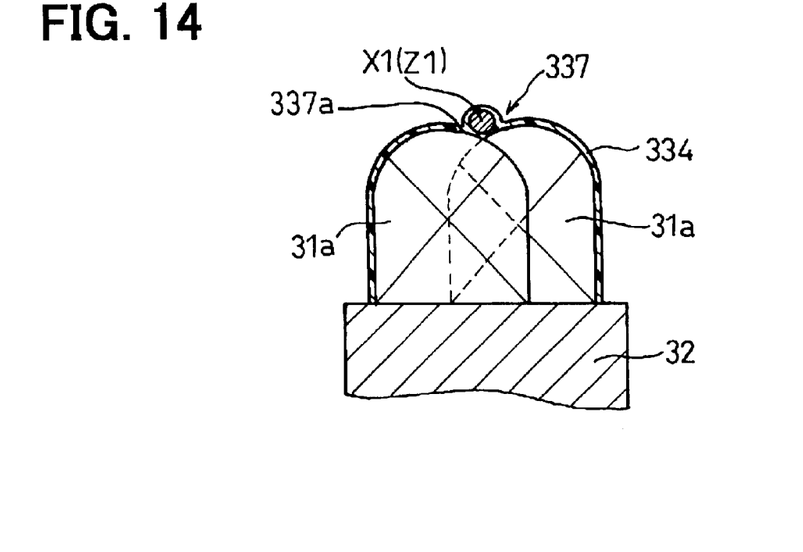
FIG. 14 is a schematic view showing a rear coil end that includes a shallow valley for holding a lead wire therein, as a modified form of the third embodiment.

A third embodiment of the present invention will be described with reference to FIG. 13. In this embodiment, the rear coil end 31a is formed to have two top portions and a valley 337 between two top portions. The valley 337 includes an inner surface 337a that engages with the lead wire X1 (Z1). The lead wire is disposed in the valley 337 circularly extending along the circular coil end 31a and connected to the valley 337 with the adhesive 334. The lead wire does not move relative to the coil end 31a because the lead wire is firmly held in the valley 337. The coil end 31a may be modified to a shape shown in FIG. 14. The coil end 31a is formed by positioning its two portions in an overlapped manner. In this case, the valley 337 is not deep, but has a sufficient depth to keep the lead wire therein.

The present invention is not limited to the embodiments described above, but it may be variously modified. For example, though the lead wire is connected to and held on the rear coil end 31a in the foregoing embodiments, it is possible to hold the lead wire on the front coil end. Though the U-shaped conductor segments 33 are used for forming the stator winding 31 in the foregoing embodiments, it is possible to form the stator winding 31 by winding a continuous wire. The way of forming the stator winding 31 may be variously modified by changing the types of electrical connection and method of electrically connecting the segment ends. The present invention is also applicable to rotary electric machines other than the alternator described above.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A stator of an alternator, the stator comprising:

a cylindrical stator core;

a stator winding composed of phase-windings held in the stator core, the stator winding forming a circular coil end extending from an axial end of the cylindrical stator core;

lead wires led out from the phase-windings; and a depressed ditch formed along the circular coil end by deforming the stator winding, wherein the lead wires are disposed in the depressed ditch and firmly held therein.

2. The stator of an alternator as in claim 1, wherein:

the lead wire has a substantially rectangular cross-section; and the depressed ditch includes two side surfaces contacting two sides of the rectangular cross-section of the lead wire.

3. A stator of an alternator, the stator comprising:

a cylindrical stator core;

a stator winding composed of phase-windings held in the stator core, the stator winding forming a circular coil end extending from an axial end of the cylindrical stator core; and lead wires led out from the phase-windings, each lead wire having depressed groove formed thereon by deforming the lead wire, wherein the lead wires are disposed along the circular coil end by engaging the depressed groove with a top portion of the circular coil end.

4. A stator of an alternator, the stator comprising:

a cylindrical stator core;

a stator winding composed of phase-windings held in the stator core, the stator winding forming a circular coil end extending from an axial end of the cylindrical stator core; and lead wires led out from the phase-windings, wherein the circular coil end includes circular peaks forming a valley therebetween; and the lead wires are disposed in the valley and firmly held therein.

5. A stator of an alternator, the stator comprising:

a cylindrical stator core;

a stator winding composed of phase-windings held in the stator core, the stator winding forming a circular coil end extending from an axial end of the cylindrical stator core;

lead wires led out from the phase-windings; and a depressed ditch formed along the circular coil end by deforming the stator winding, wherein:

the lead wire has a substantially rectangular cross-section, and the depressed ditch includes two side surfaces; and the lead wires are disposed in the depressed ditch so that two sides of the rectangular cross-section of the lead wire engage with two side surfaces of the depressed ditch.

* * * * *